United States Patent
Akita

(10) Patent No.: US 11,549,467 B2
(45) Date of Patent: Jan. 10, 2023

(54) FUEL VAPOR TREATMENT APPARATUS

(71) Applicant: TOYOTA JIDOSHA KABUSHIKI KAISHA, Toyota (JP)

(72) Inventor: Tatsuhiko Akita, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 200 days.

(21) Appl. No.: 16/568,989

(22) Filed: Sep. 12, 2019

(65) Prior Publication Data

US 2020/0116108 A1    Apr. 16, 2020

(30) Foreign Application Priority Data

Oct. 16, 2018  (JP) .............................. JP2018-195051

(51) Int. Cl.
*F02M 25/08* (2006.01)
*F02D 41/00* (2006.01)

(52) U.S. Cl.
CPC ....... *F02M 25/0809* (2013.01); *F02D 41/004* (2013.01); *F02M 25/0836* (2013.01)

(58) Field of Classification Search
CPC ........... F02M 25/0809; F02M 25/0836; F02M 25/089; F02D 41/004; F02D 41/0037
See application file for complete search history.

(56) References Cited

U.S. PATENT DOCUMENTS

| | | | |
|---|---|---|---|
| 6,371,089 B1 * | 4/2002 | Matsuoka | B60W 20/50 123/519 |
| 9,957,924 B2 * | 5/2018 | Dudar | F02M 25/0809 |
| 10,138,827 B2 * | 11/2018 | Dudar | F02D 41/004 |
| 10,760,532 B1 * | 9/2020 | Dudar | F02D 41/0032 |
| 10,815,937 B2 * | 10/2020 | Dudar | F02B 33/34 |
| 2004/0237946 A1 * | 12/2004 | Murakami | F02M 25/08 123/520 |
| 2009/0266147 A1 * | 10/2009 | Maegawa | G01F 22/02 73/40.7 |
| 2011/0146631 A1 * | 6/2011 | Konohara | F02M 25/089 123/520 |
| 2013/0199504 A1 * | 8/2013 | Takeishi | F02M 25/0809 123/520 |
| 2014/0283795 A1 * | 9/2014 | Kimura | F02M 25/0809 123/520 |
| 2016/0069304 A1 * | 3/2016 | Guidi | F02M 25/0836 123/518 |
| 2016/0108864 A1 * | 4/2016 | Tochihara | F02M 25/0809 123/519 |
| 2017/0276078 A1 * | 9/2017 | Imaizumi | F02D 41/0007 |
| 2018/0163646 A1 * | 6/2018 | Tsutsumi | F02M 35/1038 |
| 2018/0230926 A1 | 8/2018 | Insixiengmai | |
| 2018/0238273 A1 * | 8/2018 | Maegawa | F02M 25/0809 |
| 2019/0093586 A1 * | 3/2019 | Ito | F02B 37/18 |

FOREIGN PATENT DOCUMENTS

| | | |
|---|---|---|
| JP | 2013-160108 | 8/2013 |
| JP | 2017-521598 A | 8/2017 |
| JP | 2018-131915 A | 8/2018 |

* cited by examiner

*Primary Examiner* — Phutthiwat Wongwian
*Assistant Examiner* — Susan E Scharpf
(74) *Attorney, Agent, or Firm* — Finnegan, Henderson, Farabow, Garrett & Dunner, LLP

(57) ABSTRACT

A fuel vapor treatment apparatus includes a controller configured to detect an abnormality in at least one of a first check valve, a second check valve, a second purge passage, a charging passage, and an ejector based on pressure detected by a pressure detector.

4 Claims, 6 Drawing Sheets

FUEL VAPOR TREATMENT APPARATUS

CROSS-REFERENCE TO RELATED APPLICATION

This application is based upon and claims the benefit of priority of the prior Japanese Patent Application No. 2018-195051, filed on Oct. 16, 2018, the entire contents of which are incorporated herein by reference.

FIELD OF THE INVENTION

The present invention relates to a fuel vapor treatment apparatus.

BACKGROUND

Fuel vapor generated in a fuel tank is temporarily adsorbed to a canister. The adsorbed fuel vapor is purged from the canister to an intake passage by use of negative pressure in the intake passage, and then is burned in an internal combustion engine.

In some cases, the internal combustion engine is equipped with a turbocharger. When the turbocharger operates, the pressure of the intake air increases, which makes it difficult to purge the fuel vapor by use of negative pressure. There is a technique in which an ejector is provided in the intake passage and the fuel vapor is purged to the intake passage by activating the ejector during turbocharging operation (See, Japanese Unexamined Patent Application Publication No. 2013-160108).

Such a system uses valves and passages, and there may be an abnormality such as valve failure, stuck close of a passage, and detachment of a passage.

SUMMARY OF THE INVENTION

It is therefore an object of the present invention to provide a fuel vapor treatment apparatus capable of detecting abnormality.

The above object is achieved by a fuel vapor treatment apparatus including: an adsorption unit for adsorbing fuel vapor generated in a fuel tank; a first purge passage connected between the adsorption unit and a portion of an intake passage of an internal combustion engine at a downstream side of a throttle valve; a first check valve provided in the first purge passage and opened by negative pressure in the intake passage; a valve provided in the first purge passage and positioned between the adsorption unit and the first check valve; an ejector including an exhaust port connected to the intake passage at an upstream side of a turbocharger; a charging passage connected between an introduction port of the ejector and a portion of the intake passage between the throttle valve and the turbocharger; a second purge passage connected between a suction port of the ejector and a portion of the first purge passage between the first check valve and the valve; a second check valve provided in the second purge passage and opened by operation of the ejector; a pressure detector detecting pressure in the second purge passage; and a controller configured to detect an abnormality in at least one of the first check valve, the second check valve, the second purge passage, the charging passage, and the ejector based on pressure detected by the pressure detector.

Effects of the Invention

According to the present invention, it is possible to provide a fuel vapor treatment apparatus capable of detecting abnormality.

DETAILED DESCRIPTION

Figure 1:
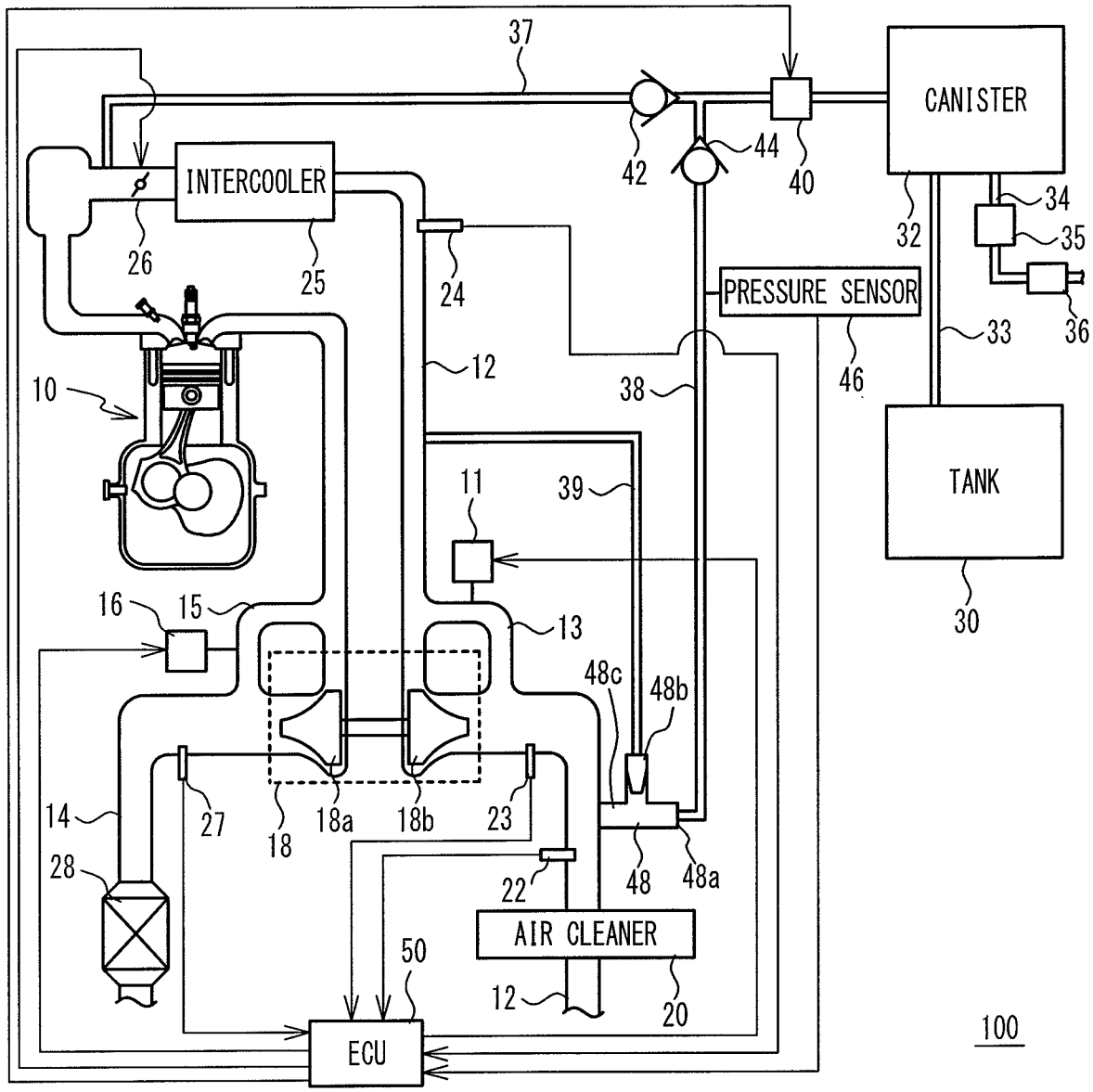
FIG. 1 is a schematic view illustrating a fuel vapor treatment apparatus.

Hereinafter, a description will be given of a control device according to a present embodiment with reference to drawings. FIG. 1 is a schematic view illustrating a fuel vapor treatment apparatus 100. The fuel vapor treatment apparatus 100 is applied to an internal combustion engine 10 (engine), and includes a tank 30, a canister 32 (adsorption unit), a pressure sensor 46 (pressure detector), an ejector 48, and an electric control unit (ECU) 50.

The internal combustion engine 10 is, for example, a gasoline engine, and is connected with an intake passage 12 and an exhaust passage 14. An air cleaner 20, an air flow meter 22, the ejector 48, a pressure sensor 23, a pressure sensor 24, an intercooler 25, and a throttle valve 26 are provided in this order from the upstream side in the intake passage 12. An air-fuel ratio sensor 27 and a catalyst 28 are provided in this order from the upstream side in the exhaust passage 14.

A turbocharger 18 includes a turbine 18a and a compressor 18b connected to each other. The turbine 18a is located in the exhaust passage 14 at the upstream side of the air-fuel ratio sensor 27. The compressor 18b is located in the intake passage 12 at the downstream side of the pressure sensor 23 and at the upstream side of the pressure sensor 24. A bypass passage 13 bypassing the compressor 18b is connected to the intake passage 12. A valve 11 is provided in the bypass passage 13. A bypass passage 15 bypassing the turbine 18a is connected to the exhaust passage 14. A valve 16 is provided in the bypass passage 15.

The intake air passes through the intake passage 12, is purified by the air cleaner 20, is cooled by the intercooler 25, and is introduced into a combustion chamber of the internal combustion engine 10. A fuel injection valve injects fuel to form an air-fuel mixture of the intake air and the fuel. The air-fuel mixture is burned in the internal combustion engine 10, and the exhaust gas caused by the combustion is discharged to the exhaust passage 14. The exhaust gas is purified by the catalyst 28 in the exhaust passage 14, and is discharged. The catalyst 28 is, for example, a three-way catalyst, and purifies CO, HC, NOx and the like in the exhaust gas.

When the turbine 18a is rotated by the exhaust gas, the compressor 18b connected to the turbine 18a is also rotated, which compresses the intake air. Thus, the pressure of the intake air at the downstream side of the compressor 18b becomes higher than that of the intake air at the upstream side.

The pressure sensor 23 detects the pressure of the intake air at the upstream side of the turbocharger 18. The pressure sensor 24 detects the pressure of the intake air at the downstream side of the turbocharger 18. The air flow meter 22 detects the flow rate of the intake air. The flow rate of the intake air changes in response to an opening degree of the throttle valve 26. The air-fuel ratio sensor 27 detects an air-fuel ratio of the air-fuel mixture.

The tank 30 stores fuel such as gasoline, and is connected to the canister 32 by a passage 33. The fuel evaporated in the tank 30 generates vapor of fuel (vaporized fuel). The canister 32 includes an adsorbent such as activated carbon, and adsorbs the fuel vapor flowing from the tank 30 through the passage 33. One end of a passage 34 is connected to the canister 32. The other end of the passage 34 is released to the atmosphere. A pump 35 and a filter 36 are provided in the passage 34.

One end of a purge passage 37 (first purge passage) is connected to the canister 32. The other end of the purge passage 37 is connected to the intake passage 12 at the downstream side of the throttle valve 26. A valve 40 and a check valve 42 (first check valve) are provided in the purge passage 37 in this order from the canister 32. One end of a purge passage 38 (second purge passage) is connected to a portion, between the valve 40 and the check valve 42, of the purge passage 37. The other end of the purge passage 38 is connected to a suction port 48a of the ejector 48. A check valve 44 (second check valve) and the pressure sensor 46 are provided in the purge passage 38 in this order from the purge passage 37. The valve 40 is, for example, a normally closed solenoid valve, which is in a closing state at the time of being not energized and in an opening state at the time of being energized.

The check valve 42 permits the gas to flow from the canister 32 toward the intake passage 12, and prohibits the gas from the intake passage 12 toward the canister 32. The check valve 44 permits the gas to flow from the purge passage 37 toward the ejector 48, and prohibits the gas from the ejector 48 toward the purge passage 37.

One end of a charging passage 39 is connected to the intake passage 12 between the downstream side of the compressor 18b and the upstream side of the throttle valve 26. The other end of the charging passage 39 is connected to an introduction port 48b of the ejector 48. The ejector 48 is incorporated into the intake passage 12, and an exhaust port 48c is attached to the intake passage 12 at the upstream side of the compressor 18b without using a pipe.

The ECU 50 includes a central processing unit (CPU), and storage devices such as a random access memory (RAM) and a read only memory (ROM). The ECU 50 achieves various controls by executing programs stored in the storage device, such as the ROM. The ECU 50 adjusts each opening degree of the valves 11, 16 and 40 and the throttle valve 26. The ECU 50 causes the internal combustion engine 10 to execute natural intake operation (natural aspiration (NA) operation, non-turbocharging operation) that does not execute intake turbocharging by, for example, fully closing the valves 11 and 16, and to execute turbocharging operation by the turbocharger 18 by opening the valves 11 and 16.

Further, the ECU 50 obtains the flow rate of the intake air from the air flow meter 22, obtains the air-fuel ratio from the air-fuel ratio sensor 27, obtains the pressure in the intake passage 12 from the pressure sensors 23 and 24, and obtains the pressure in the purge passage 38 from the pressure sensor 46. In the present embodiment, the atmospheric pressure includes not only the pressure in the atmosphere but also the pressure of the intake air fluctuating after passing through the intake passage 12 and the air cleaner 20 or the like. Negative pressure is lower than the atmospheric pressure. The supercharging pressure is the pressure after being supercharged by the turbocharger 18, which is higher than the atmospheric pressure.

(Purge of Fuel Vapor)

Next, the purge of the fuel vapor will be described. The canister 32 adsorbs the fuel vapor. The fuel vapor is purged into the purge passage 37 or 38 and is introduced into the intake passage 12, so that the fuel vapor is burned together with the intake air in the internal combustion engine 10.

During the NA operation, the pressure in the intake passage 12 at the downstream side of the throttle valve 26 is negative pressure lower than the atmospheric pressure. Therefore, when the check valve 42 opens and the ECU 50 opens the valve 40, the fuel vapor flows from the canister 32 through the purge passage 37 into the intake passage 12, and then is supplied to the internal combustion engine 10. In addition, the pressure in the intake passage 12 at the upstream side of the throttle valve 26 is higher than that in the intake passage 12 at the downstream side of the throttle valve 26, and is, for example, approximately the same as the atmospheric pressure. It is thus difficult for the fuel vapor to flow to the purge passage 38.

The compressor 18b supercharges the intake air during the turbocharging operation, so that the pressure in the intake passage 12 at the downstream side of the compressor 18b becomes the supercharging pressure higher than the atmospheric pressure. The check valve 42 closes, and it is thus difficult for the fuel vapor to flow to the purge passage 37. A part of the supercharged intake air is introduced into the introduction port 48b of the ejector 48 through the charging passage 39, and then the ejector 48 operates. A nozzle is formed at the introduction port 48b of the ejector 48, so that the supercharged air supplied to the introduction port 48b is depressurized. Therefore, the gas in the purge passage 38 is sucked from the suction port 48a, and then the check valve 44 opens.

The ECU 50 periodically switches between opening and closing of the valve 40. Accordingly, the fuel vapor is sucked from the canister 32 through the valve 40, the check valve 44, and the purge passage 38 to the ejector 48, and then flows to the intake passage 12. At this time, as indicated by a broken line in FIG. 6 described later, the pressure in the purge passage 38 also periodically changes in synchronization with the opening and closing of the valve 40, and the pressure sensor 46 detects pulsation of a periodic change in pressure.

The fuel vapor treatment apparatus 100 as described above includes the valves and the passages, and it is required to detect abnormalities of these members. The abnormalities are, for example, a stuck close failure in which the check valve remains close (close failure), a stuck open failure in which the check valve remains open (open failure), blockage of the ejector 48 and the passages due to foreign matters, and the passage detachment (falling off).

(Abnormality Detection)

Figure 2:
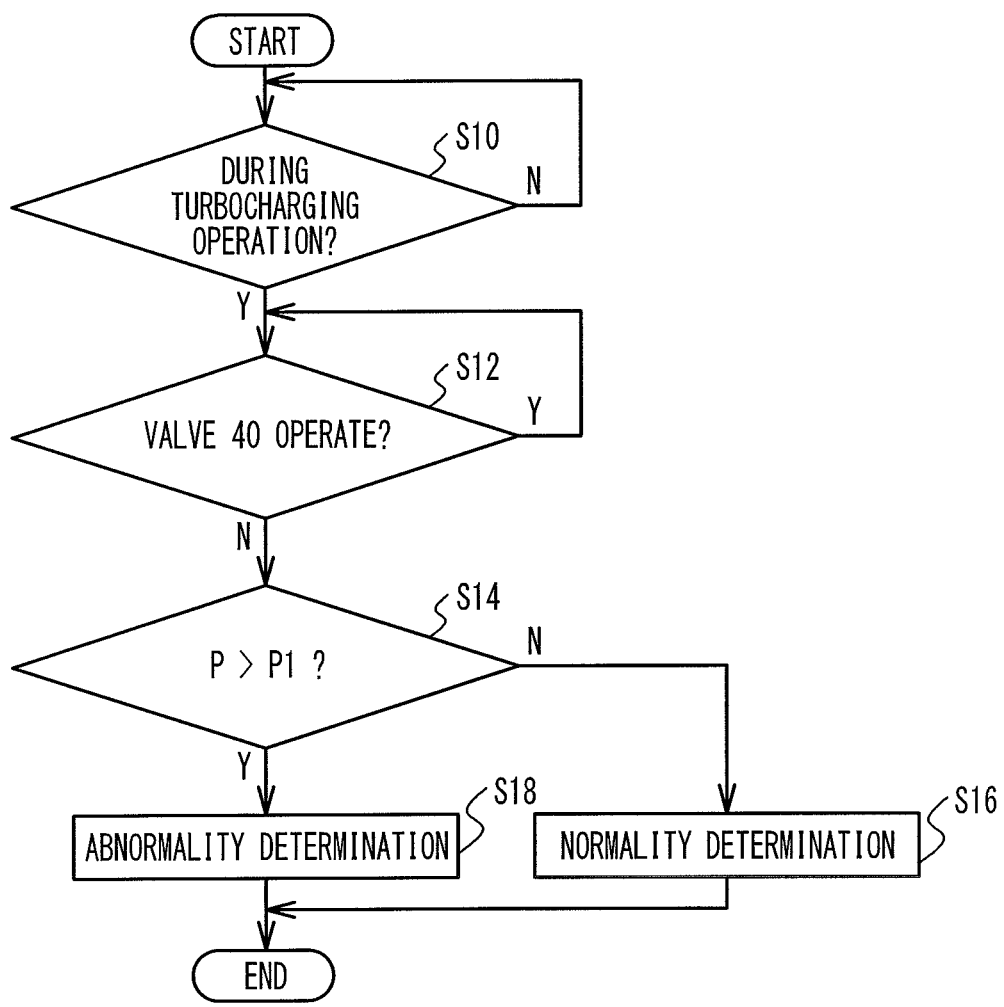
FIG. 2 is a flowchart illustrating processing executed by an ECU.
Figure 3:
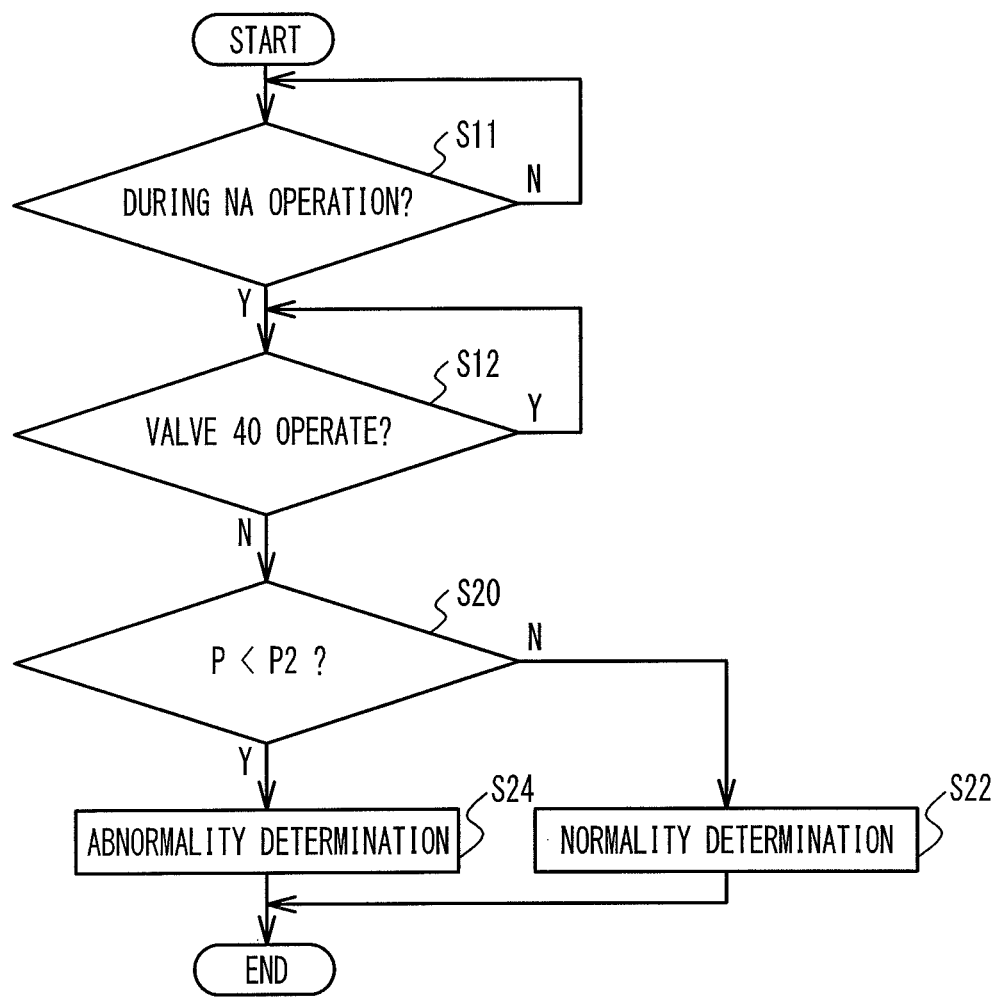
FIG. 3 is a flowchart illustrating processing executed by the ECU.
Figure 4:
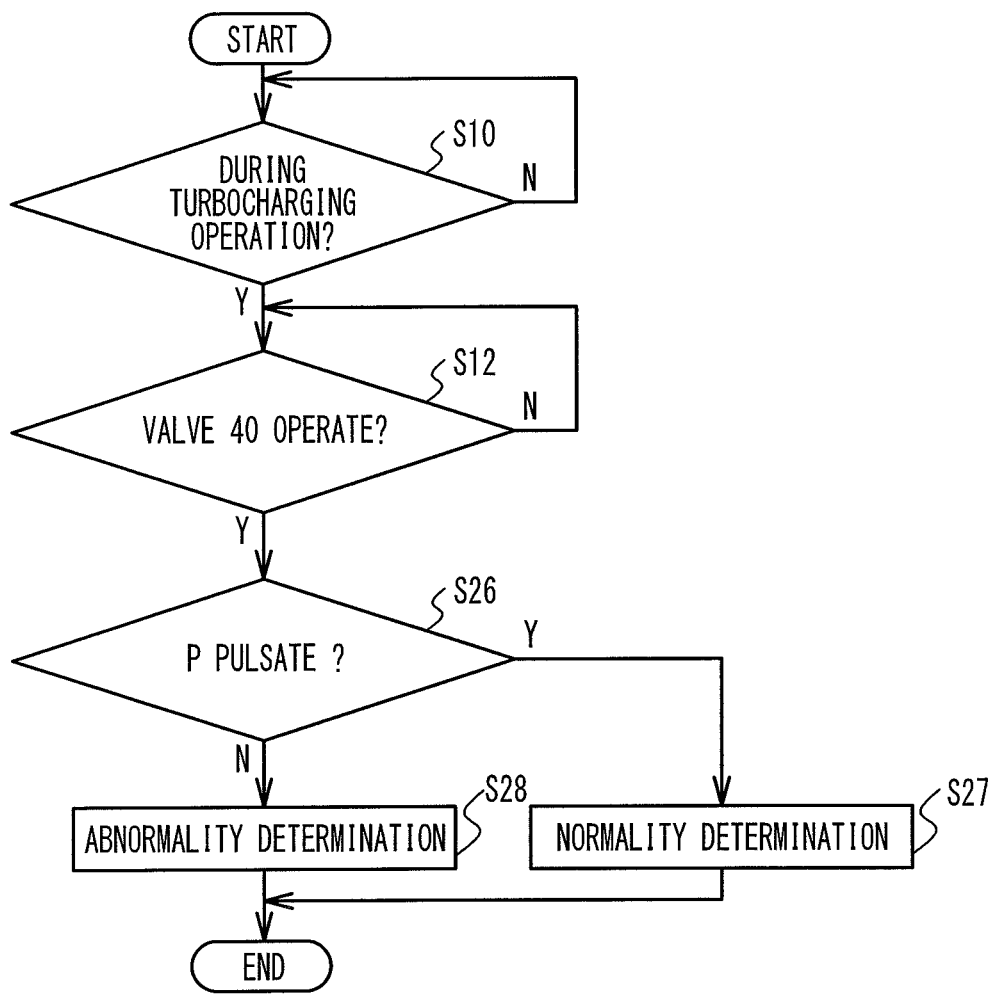
FIG. 4 is a flowchart illustrating processing executed by the ECU.

Next, abnormality detection will be described with reference to FIGS. 2 to 6. FIGS. 2 to 4 are flowcharts illustrating processing executed by the ECU 50. The processing may be executed, for example, at predetermined traveling distances or at predetermined time intervals, or may be executed plural times from the time when the engine starts to the time when the engine stops.

Figure 5A:
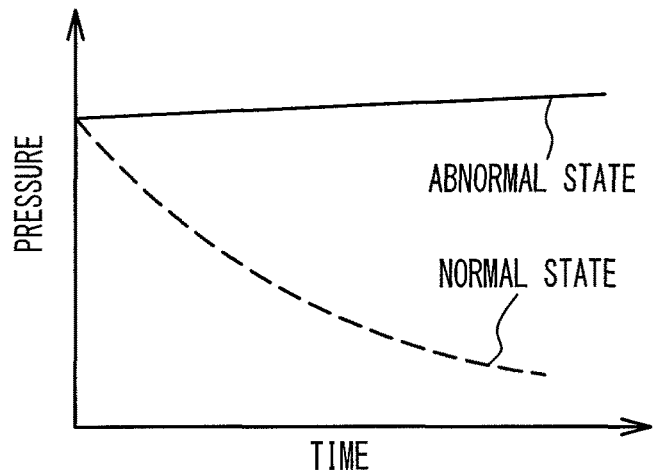
FIGS. 5A to 5C are schematic diagrams illustrating pressure behavior.
Figure 5B:
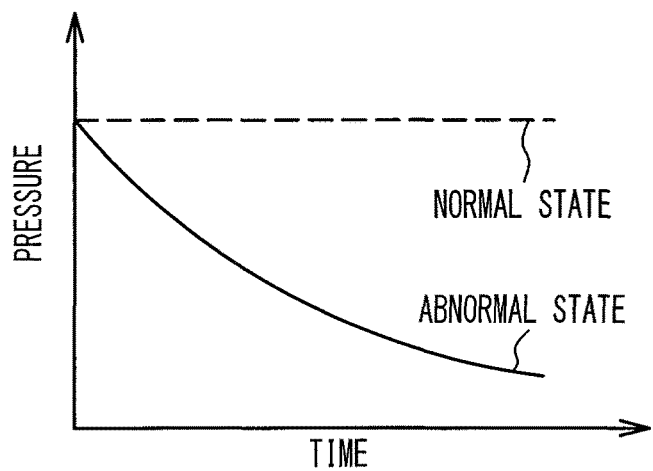
Figure 5C:
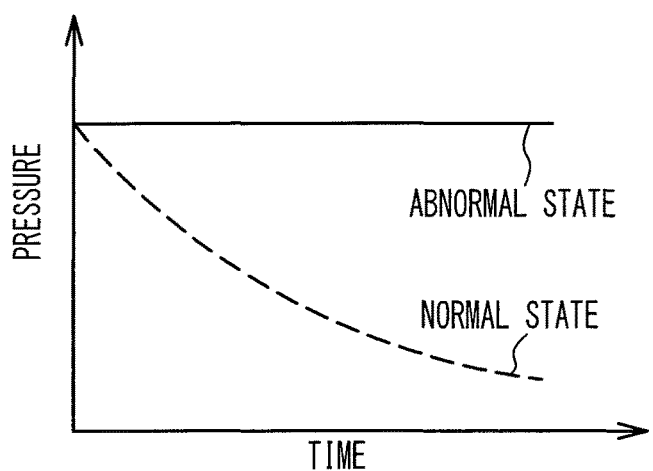
Figure 6:
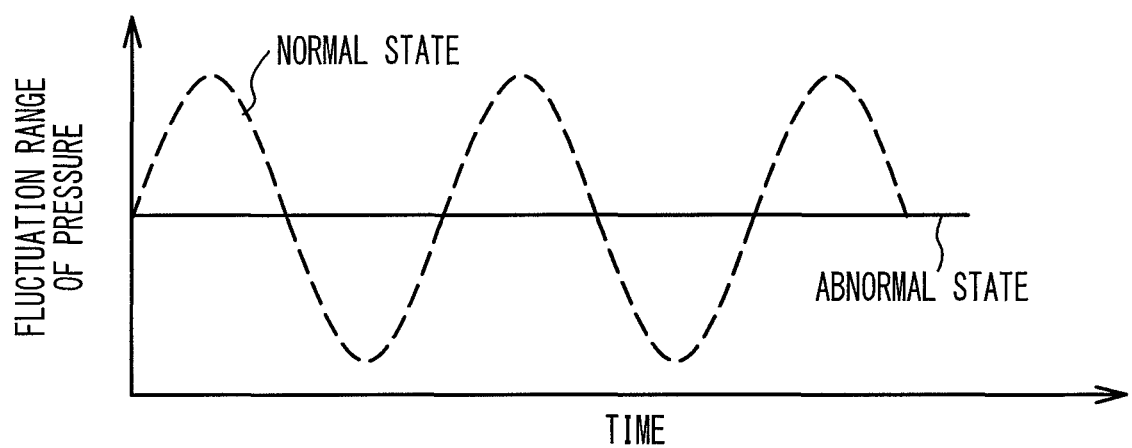
FIG. 6 is a schematic view illustrating the pressure behavior.

FIG. 5A to FIG. 6 are schematic views illustrating pressure behavior. In FIG. 5A to FIG. 5C, a horizontal axis indicates time, and a vertical axis indicates pressure. A broken line indicates pressure in a normal state, and a solid line indicates pressure in an abnormal state. In FIG. 6, a vertical axis indicates a fluctuation range of the pressure, a broken line indicates the pressure pulsation in a normal state, and a solid line indicates the pressure non-pulsating behavior in an abnormal state. First, abnormality detection of the check valve will be described.

(Abnormality Detection of Check Valve)

FIG. 2 illustrates the processing of detecting an open failure of the check valve 42. As illustrated in FIG. 2, the ECU 50 determines whether or not the internal combustion engine 10 is in the turbocharging operation (step S10). For example, when each opening degree of the valves 11 and 16 is greater than that thereof fully closed, the internal combustion engine 10 is in the turbocharging operation. When a negative determination is made (No), step S10 is repeated. When an affirmative determination is made (Yes), the ECU 50 determines whether or not the valve 40 operates (Step S12). The operation of the valve 40 is to repeat opening and closing. When an affirmative determination is made, step S12 is repeated.

When a negative determination is made, the normally closed valve 40 is in a close state. The ECU 50 determines whether or not pressure P in the purge passage 38 measured by the pressure sensor 46 is higher than a threshold value P1 (first pressure) (step S14). The threshold value P1 may be, for example, the atmospheric pressure, or the pressure (shutoff pressure) in the purge passage 38 at the time when the ejector 48 operates and the valve 40 closes. When a negative determination is made, the ECU 50 determines the normal state, that is, the ECU 50 determines that the check valve 42 does not have an open failure (step S16). When an affirmative determination is made, the ECU 50 determines the abnormal state, that is, the ECU 50 determines that the check valve 42 has an open failure (step S18). After step S16 or S18, the processing ends.

When the check valve 42 is normal during the turbocharging operation, the check valve 42 prevents the supercharged intake air from flowing into the purge passage 38 through the purge passage 37. The supercharged intake air is introduced into the introduction port 48b of the ejector 48, and then the ejector 48 operates. When the valve 40 closes, the pressure P in the purge passage 38 decreases and becomes lower than the threshold value P1 in FIG. 2 (steps S14 and S16 in FIG. 2), as illustrated by the broken line in FIG. 5A. As described above, the pressure P at this time is the shutoff pressure.

On the other hand, when the check valve 42 has an open failure, the supercharged intake air flows into the purge passage 38 through the purge passage 37 and the check valve 42. Therefore, the pressure P becomes higher than the shutoff pressure in the normal state (steps S14 and S18, solid line in FIG. 5A). For example, the pressure P becomes higher than the atmospheric pressure.

FIG. 3 illustrates processing of open failure detection of the check valve 44. As illustrated in FIG. 3, the ECU 50 determines whether or not the internal combustion engine 10 is in the NA operation (step S11). For example, when the valves 11 and 16 fully open, the internal combustion engine 10 is in the NA operation. When a negative determination is made, step S11 is repeated. When an affirmative determination is made, the ECU 50 determines whether or not the valve 40 operates (step S12). When an affirmative determination is made, step S12 is repeated. When a negative determination is made, it is determined whether or not the pressure P measured by the pressure sensor 46 is lower than, for example, P2 (second pressure) which is the atmospheric pressure (step S20). When a negative determination is made, the ECU 50 determines a normal state, that is, the ECU 50 determines that the check valve 44 does not have an open failure (step S22). When an affirmative determination is made, the ECU 50 determines the abnormal state, that is, that the check valve 44 has an open failure (step S24). After step S22 or S24, the processing ends.

The pressure in the intake passage 12 at the downstream side of the throttle valve 26 is negative pressure during the NA operation, so that the check valve 42 opens, and the check valve 44 closes. Therefore, when the check valve 44 is normal, the purge passage 38 does not communicate with the intake passage 12 at the downstream side of the compressor 18b but with the intake passage 12 at the upstream side. Therefore, the pressure P in the purge passage 38 becomes, for example, approximately the same as the atmospheric pressure (steps S20 and S22 in FIG. 3, broken line in FIG. 5B).

On the other hand, when the check valve 44 has an open failure, the purge passage 38 communicates with the intake passage 12 on its downstream side through the check valves 44 and 42 and the purge passage 37. Therefore, the pressure P in the purge passage 38 becomes lower than that in the normal state as illustrated by the solid line in FIG. 5B, and lower than the threshold P2 in FIG. 3 (steps S20 and S24).

FIG. 4 illustrates the processing of the close failure detection of the check valve 44. Steps S10 and S12 are executed as illustrated in FIG. 4. When a negative determination is made in step S12, step S12 is repeated. When an affirmative determination is made, the ECU 50 determines whether or not the pressure P in the purge passage 38 pulsates (step S26). When an affirmative determination is made, the ECU 50 determines the normal state, that is, the ECU 50 determines that the check valve 44 does not have a close failure (step S27). When a negative determination is made, the ECU 50 determines the abnormality determination, that is, the ECU 50 determines that the check valve 44 has a close failure (step S28). After step S27 or S28, the processing ends.

When the valve 40 repeatedly opens and closes during the turbocharging operation, the fuel vapor repeatedly flows into and stops flowing into the purge passage 38. Thus, the pressure P in the purge passage 38 pulsates (steps S26 and S27, broken line in FIG. 6). On the other hand, when the check valve 44 has a close failure, the purge passage 38 does not communicate with the purge passage 37 and is blocked. Therefore, even if the valve 40 operates, the pressure P does not pulsate (steps S26 and S28, solid line in FIG. 6), and the pressure P becomes, for example, the shutoff pressure. The state where the pressure P does not pulsate includes a state where the pressure P is constant and a state where the pressure P fluctuates without being synchronized with the opening and closing of the valve 40.

(Abnormality Detection of Passage)

Next, abnormality detection of passage will be described. The processing of detection of the blockage and the detachment of the purge passage 38 is executed by the processing of FIG. 4. When the purge passage 38 is detached from the ejector 48 or from the check valve 44, one end of the purge passage 38 is released to the atmosphere. Therefore, even if the valve 40 opens and closes, the pressure P does not pulsate (steps S26 and S28 in FIG. 4 and the solid line in FIG. 6), and the pressure P becomes approximately the same as, for example, the atmospheric pressure.

When a portion, closer to the ejector 48 than the pressure sensor 46, of the purge passage 38 is blocked with, for example, foreign matters, it is difficult to suck the fuel vapor by the ejector 48. Therefore, the pressure P does not pulsate even when the valve 40 opens and closes (steps S26 and S28, solid line in FIG. 6). The pressure P is, for example, approximately the atmospheric pressure.

Even when a portion, closer to the check valve 44 than the pressure sensor 46, of the purge passage 38 is blocked with, for example, foreign matters, it is difficult to suck the fuel vapor, and the pressure P does not pulsate (steps S26 and S28, solid line in FIG. 6). Since the ejector 48 operates, the pressure P is, for example, the shutoff pressure.

The processing of detection of the blockage and the detachment of the charging passage 39 is achieved by the processing of FIG. 2 or FIG. 4. First, the example of FIG. 2 will be described. Herein, the threshold value P1 is, for example, the shutoff pressure. When the valve 40 closes during the turbocharging operation, the ejector 48 operates to execute suction between the purge passage 38 and the valve 40. As indicated by a broken line in FIG. 5C, the pressure P in the purge passage 38 decreases, and becomes, for example, the shutoff pressure (steps S14 and S16 in FIG. 2).

On the other hand, when the charging passage 39 is blocked or detached, the supercharged intake air is difficult to be supplied to the ejector 48, and the ejector 48 does not operate. Therefore, as illustrated by the solid line in FIG. 5C, the pressure P in the purge passage 38 becomes higher than the shutoff pressure in the normal state and higher than the threshold value P1 in FIG. 2 (steps S14 and S18), which is approximately the same as, for example, the atmospheric pressure.

Next, an example of FIG. 4 will be described. When the charging passage 39 is blocked or detached, the ejector 48 does not operate. Even if the valve 40 operates, the pressure P does not pulsate (steps S26 and S28 in FIG. 4 and the solid line in FIG. 6) and becomes approximately the same as, for example, the atmospheric pressure.

(Abnormality Detection of the Ejector 48)

Next, detection of the blockage of the ejector 48 will be described. The processing of detection of the ejector 48 is achieved by the processing of FIGS. 2 and 4. First, the example of FIG. 2 will be described. Herein, the threshold value P1 is, for example, the atmospheric pressure or the shutoff pressure. During the turbocharging operation, the ejector 48 operates. When the valve 40 closes, the pressure P in the purge passage 38 decreases and becomes the shutoff pressure (steps S14 and S16 in FIG. 2, broken line in FIG. 5A). On the other hand, when the exhaust port of the ejector 48 is blocked, the operation of the ejector 48 is suppressed. Therefore, the pressure P becomes higher than the shutoff pressure and the atmospheric pressure in the normal state, that is, the pressure P becomes higher than the threshold value P1 (steps S14 and S18, solid line in FIG. 5A). The pressure P at this time is approximately the same as the supercharging pressure.

Next, an example of FIG. 4 will be described. When the exhaust port of the ejector 48 is blocked, even if the valve 40 opens and closes, the pressure P does not pulsate (steps S26 and S28 in FIG. 4, solid lines in FIG. 6) and becomes approximately the same as, for example, the supercharging pressure.

In the present embodiment, the pressure sensor 46 detects the pressure P in the purge passage 38, and the ECU 50 detects an abnormality in each component of the fuel vapor treatment apparatus 100 based on the pressure P. According to the operating state of the internal combustion engine 10, the state of the valve 40, and the pressure P in the purge passage 38, it is possible to identify the abnormal part and the abnormal content, and the accuracy of abnormality detection is improved.

For example, as illustrated in FIG. 2, when the internal combustion engine 10 is in the turbocharging operation, the valve 40 closes, and the pressure P is higher than P1, the ECU 50 detects at least one of the open failure of the check valve 42, the blockage or the detachment of the charging passage 39, and the blockage of the exhaust port 48c of the ejector 48. As illustrated in FIG. 3, when the internal combustion engine 10 is in the NA operation, the valve 40 closes, and the pressure P is lower than P2, the ECU 50 detects the open failure of the check valve 44. As illustrated in FIG. 4, when the internal combustion engine 10 is in the turbocharging operation, the valve 40 operates, and the pressure P does not pulsate, the ECU 50 detects at least one of the closing failure of the check valve 44, the blockage or the detachment of the purge passage 38 or the charging passage 39, and the blockage of the exhaust port 48c of the ejector 48. The ECU 50 may execute the plurality of abnormality detection processing described above in parallel, or may execute at least one of them.

Since the pressure P pulsates in synchronization with the opening and closing of the valve 40, the ECU 50 detects an abnormality by determining whether or not the pulsation of the pressure P generates. If the pressure P is, for example, constant or the pressure P fluctuates in non-synchronization with the operation of the valve 40, an abnormality is detected.

The threshold pressures P1 and P2 may be, for example, the pressures in the normal state in each abnormality detection. In the open failure detection of the check valve 42, the blockage detection of the ejector 48, and the abnormality detection of the charging passage 39 as illustrated in FIG. 2, the pressure P in the purge passage 38 becomes the shutoff pressure lower than the atmospheric pressure in the normal state, and becomes higher than the shutoff pressure in the abnormal state. Therefore, by setting P1 to, for example, the shutoff pressure, the abnormality detection is achieved. Since the shutoff pressure and the pressure in the abnormal state may change depending on the supercharging pressure, the ECU 50 may store the threshold value P1 corresponding to the supercharging pressure.

In the open failure detection of the check valve 44 in FIG. 3, the pressure P of the purge passage 38 becomes, for example, the atmospheric pressure in the normal state, and negative pressure in the open failure state. Therefore, by setting P2 to, for example, the atmospheric pressure, the abnormality detection is achieved.

Additionally, the threshold is not limited to the pressure in the normal state. For example, in the open failure detection of the check valve 42 and the detection of the blockade of the ejector 48, the pressure P in the purge passage 38 becomes higher than the atmospheric pressure in the abnormal state. Therefore, P1 may be, for example, the atmospheric pressure. P2 may be higher than the negative pressure generated in the purge passage 38 in the state of the open failure of the check valve 44 and lower than the atmospheric pressure. The ECU 50 may store P2 corresponding to the negative pressure generated at the downstream side of the throttle valve 26 in the NA operation.

In the present embodiment, the pressure sensor 46 may be provided in the purge passage 38. For example, the canister 32 may not be provided with a key-off pump or the like. This suppresses an increase in cost of the fuel vapor treatment apparatus 100.

The ejector 48 is incorporated into the intake passage 12 and is not easily detached from the intake passage 12. Therefore, the detection processing of the detachment of the ejector 48 may not be executed. This simplifies the processing executed by the ECU 50.

Although some embodiments of the present invention have been described in detail, the present invention is not limited to the specific embodiments but may be varied or changed within the scope of the present invention as claimed.

The invention claimed is:

1. A fuel vapor treatment apparatus comprising:
a canister for adsorbing fuel vapor generated in a fuel tank;
a first purge passage connected between the canister and a portion of an intake passage of an internal combustion engine at a downstream side of a throttle valve;
a first check valve that is provided in the first purge passage and is opened by negative pressure in the intake passage and permits a gas to flow from the canister toward the intake passage;
a solenoid valve provided in the first purge passage and positioned between the canister and the first check valve;
an ejector including an exhaust port connected to the intake passage at an upstream side of a turbocharger;
a charging passage connected between an introduction port of the ejector and a portion of the intake passage between the throttle valve and the turbocharger;
a second purge passage connected between a suction port of the ejector and a portion of the first purge passage between the first check valve and the solenoid valve;
a second check valve that is provided in the second purge passage and is opened by operation of the ejector and permits a gas to flow from the first purge passage toward the suction port of the ejector;
a pressure sensor being provided in the second purge passage and positioned between the ejector and the second check valve and detecting pressure in the second purge passage; and
a controller configured to detect an abnormality in at least one of the first check valve, the second check valve, the second purge passage, the charging passage, and the ejector based on pressure detected by the pressure sensor,
the controller being configured to detect, during an abnormality detecting process, an abnormality in at least one of the second check valve, the second purge passage, the charging passage, and the ejector, when the internal combustion engine is in a turbocharging operation, the solenoid valve is operated to repeatedly open and close during the abnormality detecting process, and the pressure detected by the pressure sensor does not pulsate,
wherein the controller is configured to detect the abnormality when the pressure detected by the pressure sensor remains constant while the solenoid valve repeatedly opens and closes during the abnormality detecting process or when the pressure detected by the pressure sensor fluctuates in non-synchronization with the repeated opening and closing of the solenoid valve during the abnormality detecting process.

2. The fuel vapor treatment apparatus according to claim 1, wherein the abnormality in the second check valve detected by the controller is stuck close, when the internal combustion engine is in the turbocharging operation, the solenoid valve opens and closes, and the pressure detected by the pressure sensor does not pulsate.

3. The fuel vapor treatment apparatus according to claim 1, wherein the abnormality in the second purge passage or the charging passage detected by the controller is blockage or detachment, when the internal combustion engine is in the turbocharging operation, the solenoid valve opens and closes, and the pressure detected by the pressure sensor does not pulsate.

4. The fuel vapor treatment apparatus according to claim 1, wherein the abnormality in the ejector detected by the controller is blockage of the exhaust port of the ejector, when the internal combustion engine is in the turbocharging operation, the solenoid valve opens and closes, and the pressure detected by the pressure sensor does not pulsate.

\* \* \* \* \*